June 17, 1930.  G. CARLSON  1,764,198
CAGE FOR ROLLER BEARINGS
Filed June 29, 1929
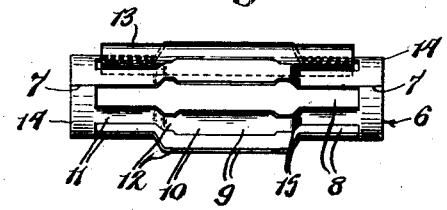
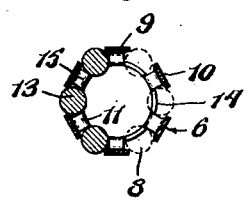
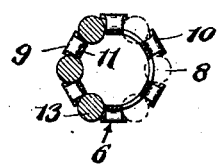
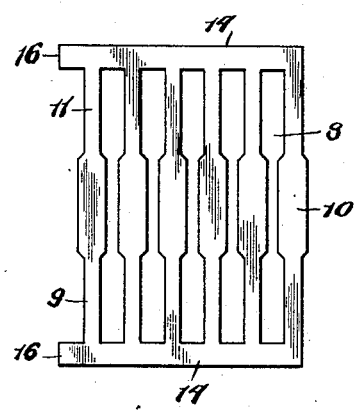
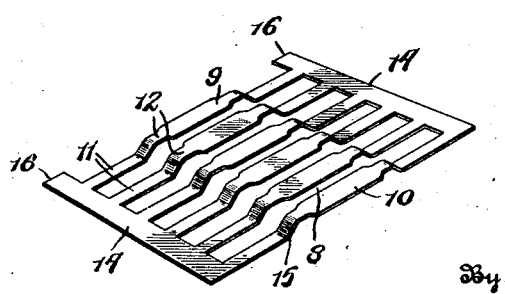
Inventor
Gustaf Carlson
By Pojjo and Powers
Attorneys Patented June 17, 1930

1,764,198

UNITED STATES PATENT OFFICE

GUSTAF CARLSON, OF BUFFALO, NEW YORK

CAGE FOR ROLLER BEARINGS

Application filed June 29, 1929. Serial No. 374,884.

This invention relates to cages for roller bearings and has for an object the production of a cage of this character which will be of simple construction and which can be economically formed from a single sheet of material with a minimum number of operations and in which the roller bearings can be readily assembled at low cost.

A further purpose is to provide such a roller bearing cage which can be made entirely automatically and can be made with standard equipment no special machinery being required.

Another object is to provide a cage of this type in which the rollers are positively held in parallel relation by the connected spacing bars and which will permit the ready assembling of the rollers therein after its formation by forcing the rollers into their retaining slots, the cage being designed to permit this being done manually.

A further object is to provide a bearing cage in which the connections between the spacing bars and the ends of the cage are not weakened by the slotting and bending operations.

With these objects in view, the invention consists generally in the production of a blank by suitably slotting a sheet of material to provide connected spacing bars, offsetting the central portions of the spacing bars and the forming of the blank into a tube, the ends being joined in any suitable manner.

The invention is illustrated in the accompanying drawings, in which:—

Figure 1 is a plan view of the cage.

Figure 2 is a section on the line 2—2 of Fig. 1.

Figure 3 is a section on the line 3—3 of Fig. 1.

Figure 4 is a plan view of the slotted blank from which the cage is formed.

Figure 5 is a perspective of the same after the offsetting of the central portions of the spacing bars.

The bearing cage comprises a tube 6 suitably formed from a single sheet of material, the ends of which may be suitably joined as at 7 as by welding. As illustrated in Figure 1, the tube 6 has circumferentially spaced slots 8 which provide spacing bars 9. The spacing bars 9 are radially offset at their central portions as at 10, the said offset portions with the exception of short terminal portions 12 being substantially of greater width than the end portions 11. The terminal portions 12 are preferably of the same width as the end portions of the bars.

The distance between adjacent edges of the end portions 11 of the bars 10 is slightly less than the diameter of the roller 13 for which the cage is designed. The distance between adjacent edges of the widened offset portions 10 is also slightly less than the diameter of the roller 13.

As illustrated, the roller 13 is adapted to be retained in the position shown by a pair of the spacing bars 10, the adjacent edges of the outer ends 11 of which engage the roller below its axis to prevent it from moving toward the axis of the tube, the roller 13 at the same time being held from outward movement by the adjacent edges of the widened offset portions 10 of the bars 9 which engage the roller above its axis. The roller 13 is prevented from excess longitudinal movement by the uncut ends 14 of the tube.

The arrangement by which the adjacent edges of the same bars engage the rollers at their ends beneath their axes and at their central portions above their axes is possible because of the increase in the distance between the edges of the shoulders 15 formed by the offsetting of the central portions of the bars 10, the distance between the adjacent edges at this point being slightly greater than the diameter of the rollers.

In the formation of the cage, a sheet of material is suitably slotted as illustrated in Figure 4 to provide spacing bars 9 connected at their ends by the marginal portions 14. The bars 9 are preferably widened at their central portions as at 10. During the slotting operation or subsequent thereto, the widened central portions 10 of the bars and portions 12 of the bars adjacent the ends of the widened portions are displaced upwardly to provide offset portions as illustrated in Figure 5. The blank is then formed into a tube, the offset portions of the spacing bars being positioned outwardly and the short extensions 16 on one end of the blank suitably secured to the opposite end of the blank.

The specific characteristics of each blank such as its length and the arrangement of the transverse slots depend upon the specific use to which the cage, with the rollers assembled therein is to be put, it being obvious that suitable cages of various sizes for accommodating various sizes of rollers may be formed, it being necessary in each instance merely to vary the dimensions of the blank and the arrangement and size of the transverse slots. It is also apparent that a cage made according to my invention can be used with conical rollers, or with rollers of other shapes by modifying the shapes of the slots and rolling the cage into conical or suitable form. In each instance in slotting the blank the relative difference between the spacing of adjacent edges of the end portions of the spacing bars and adjacent edges of the central offset portions of the bars is so proportioned that upon the formation of the tube from the blank, there are provided circumferentially spaced slots of slightly greater lengths than the rollers, the widths of which are substantially throughout their entire lengths slightly less than the diameter of the rollers. Thus, although, at the beginning of the bending operation, the slots are narrower at their central portions because of the increased widths of the spacing bars at these points, the bending of the blank causes the separation of the edges of the central portions of the bars due to their offset condition while the widened end portions of the slots are narrowed slightly, the widening of the narrow portions of the slots and the narrowing of the widened portions being preferably obtained to such an extent as to provide a slot substantially of uniform width.

Having fully described my invention I claim:

1. A roller bearing cage adapted for automatic production including the assembly of rollers therein, comprising a strip of metal bent into tubular form and formed to provide end rings and longitudinally slotted to provide spaced parallel bars connecting said end rings, the central portions of said bars being widened and said central portions being offset radially outward to provide relatively narrow outwardly directed connecting portions connecting the relatively narrow inner end portions of said bars and the wide outer central portions of said bars, the space between the narrow end portions of said bars being narrower than the diameter of the rollers to be received to prevent inward displacement thereof and the central outer widened portions thereof being spaced slightly less than the diameter of said rollers to permit said rollers to be sprung into said slots and to prevent outward displacement thereof, said end rings preventing endwise displacement of said rollers.

2. A roller bearing cage adapted for automatic production including the assembly of rollers therein, comprising a strip of metal bent into tubular form and formed to provide equal sized end rings and longitudinally slotted to provide spaced bars connecting said end rings, said spaced parallel bars being parallel sided through substantially their entire extent and the central portions thereof being widened and said central portions being offset radially outward to provide relatively narrow outwardly directed connecting portions connecting the relatively narrow end portions of said bars and the wide outer central portions of said bars, the space between the narrow end portions of said bars being narrower than the diameter of the cylindrical rollers to be received to prevent inward displacement thereof and the central outer widened portions thereof being spaced slightly less than the diameter of said rollers to permit said rollers to be sprung into said slots and to prevent outward displacement thereof, said end rings preventing endwise displacement of said rollers.

In testimony whereof I affix my signature.

GUSTAF CARLSON.